(12) United States Patent
Hughes

(10) Patent No.: US 11,145,871 B2
(45) Date of Patent: Oct. 12, 2021

(54) ELECTROCHEMICAL CELL AND PROCESS

(71) Applicant: SIEMENS AKTIENGESELLSCHAFT, Munich (DE)

(72) Inventor: Timothy Hughes, Wantage (GB)

(73) Assignee: Siemens Aktiengesellschaft, Munich (DE)

( * ) Notice: Subject to any disclaimer, the term of this patent is extended or adjusted under 35 U.S.C. 154(b) by 224 days.

(21) Appl. No.: 15/776,594

(22) PCT Filed: Nov. 2, 2016

(86) PCT No.: PCT/EP2016/076454
§ 371 (c)(1),
(2) Date: May 16, 2018

(87) PCT Pub. No.: WO2017/084877
PCT Pub. Date: May 26, 2017

(65) Prior Publication Data
US 2018/0342739 A1    Nov. 29, 2018

(30) Foreign Application Priority Data
Nov. 16, 2015   (GB) ...................................... 1520210

(51) Int. Cl.
| | |
|---|---|
| *H01M 4/90* | (2006.01) |
| *C25B 1/00* | (2021.01) |
| *H01M 4/86* | (2006.01) |
| *H01M 8/1016* | (2016.01) |
| *H01M 8/22* | (2006.01) |

(Continued)

(52) U.S. Cl.
CPC ............. *H01M 4/9033* (2013.01); *C25B 1/00* (2013.01); *C25B 9/17* (2021.01); *C25B 9/19* (2021.01); *H01M 4/8605* (2013.01); *H01M 8/1016* (2013.01); *H01M 8/222* (2013.01)

(58) Field of Classification Search
CPC .. H01M 4/9033; H01M 4/8605; H01M 8/222; C25B 9/08; C25B 9/06; C25B 1/00; C25B 11/035; C25B 15/08; C25B 13/04
See application file for complete search history.

(56) References Cited

U.S. PATENT DOCUMENTS

| | | | |
|---|---|---|---|
| 6,881,308 B2 | 4/2005 | Denvir et al. | |
| 2003/0164292 A1 | 9/2003 | Denvir et al. | |

(Continued)

FOREIGN PATENT DOCUMENTS

| | | |
|---|---|---|
| CN | 103261483 A | 8/2013 |
| JP | 2009084615 A | 4/2009 |

(Continued)

OTHER PUBLICATIONS

Ni et al., "Technological development of hydrogen production by solid oxide electrolyzer cell (SOEC)," 2008, International Journal of Hydrogen Energy, 33, 2337-2354. (Year: 2008).*

(Continued)

*Primary Examiner* — Ula C Ruddock
*Assistant Examiner* — Matthew W Van Oudenaren
(74) *Attorney, Agent, or Firm* — Schiff Hardin LLP

(57) ABSTRACT

An electrochemical cell has a first volume exposed to respective surfaces of an anode and a cathode, the electrochemical cell also being provided with a steam inlet to allow steam into the first volume.

7 Claims, 1 Drawing Sheet

(51) Int. Cl.
*C25B 9/17* (2021.01)
*C25B 9/19* (2021.01)

(56) References Cited

U.S. PATENT DOCUMENTS

| | | | |
|---|---|---|---|
| 2008/0261098 | A1 | 10/2008 | Lemmon et al. |
| 2010/0086824 | A1* | 4/2010 | Homel ............ H01M 4/8626 429/406 |
| 2011/0062017 | A1* | 3/2011 | Elangovan ........ H01M 4/8652 204/242 |
| 2012/0241328 | A1 | 9/2012 | Joshi et al. |
| 2013/0284591 | A1 | 10/2013 | Delahaye et al. |
| 2015/0299871 | A1* | 10/2015 | Chen ................ C25B 1/02 205/555 |

FOREIGN PATENT DOCUMENTS

| | | |
|---|---|---|
| JP | 2009544843 A | 12/2009 |
| JP | 2012025985 A | 2/2012 |
| JP | 2013185582 A | 9/2013 |
| JP | 2013209684 A | 10/2013 |
| JP | 2013209685 A | 10/2013 |
| JP | 2014503689 A | 2/2014 |
| JP | 2015147996 A | 8/2015 |
| JP | 2015529740 A | 10/2015 |
| JP | 2016014176 A | 1/2016 |
| KR | 101392828 B1 | 5/2014 |

OTHER PUBLICATIONS

Murakami et al., "Electrolytic ammonia synthesis from water and nitrogen gas in molten salt under atmospheric pressure," Apr. 7, 2005, Electrochimica Acta, 50, 5423-5426. (Year: 2005).*

Murakami et al., "Electrolytic Synthesis of Ammonia in Molten Salts Under Atmospheric Pressure", J. Amer. Chem. Soc. 125 (2), pp. 334-335 (2003).

Murakami et al., "Electrolytic Ammonia Synthesis from Water and Nitrogen Gas in Molten Salt Under Atmospheric Pressure", Electrochim. Acta 50 (27), pp. 5423-5426 (2005).

Marnellos et al. (2000). Synthesis of ammonia at atmospheric pressure with the use of solid state proton conductors. J. Catal. 193, 80-88. doi:10.1006/jcat.2000.2877.

Lan et al. (2013). Synthesis of ammonia directly from air and water at ambient temperature and pressure. Sci.Rep. 3, 1145. doi:10.1038/srep01145.

Skodra et al. (2009). Electrocatalytic synthesis of ammonia from steam and nitrogen at atmospheric pressure. Solid State Ionics 180, 1332-1336.

Decision of Frant dated Mar. 8, 2021 for Japanese Patent Application No. 2018-525348.

* cited by examiner

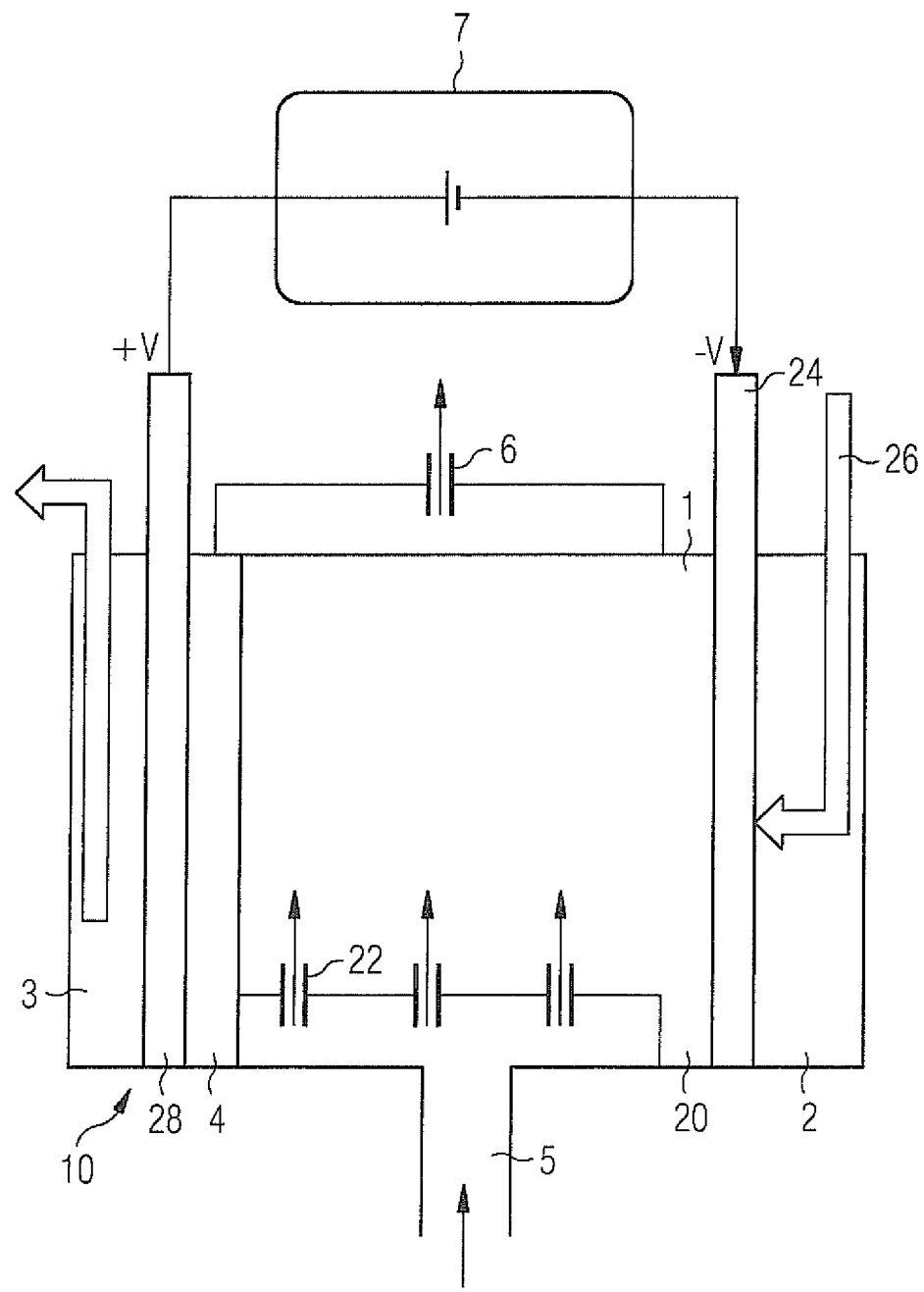

ELECTROCHEMICAL CELL AND PROCESS

BACKGROUND OF THE INVENTION

Field of the Invention

The present invention relates to electrochemical cells, particularly electrochemical cells for synthesis of ammonia $NH_3$. The present invention also relates to processes for synthesis of ammonia $NH_3$.

Description of the Prior Art

Known approaches to the requirement for synthesis of ammonia include:

(1) Haber Bosch process—pressurization and heating of $N_2$ and H2 over an iron catalyst;

(2) Electrochemical synthesis with a molten salt electrolyte and gas electrodes [1-3]; and (3) Electrochemical synthesis with a solid electrolyte and eletrocatalytic electrodes [4-6].

[1] Murakami T., T. Nishikiori, T. Nohira, and Y. Ito, "Electrolytic Synthesis of Ammonia in Molten Salts Under Atmospheric Pressure", J. Amer. Chem. Soc. 125 (2), pp. 334-335 (2003).

[2] Murakami T. et al., "Electrolytic Ammonia Synthesis from Water and Nitrogen Gas in Molten Salt Under Atmospheric Pressure", Electrochim. Acta 50 (27), pp. 5423-5426 (2005). [3] U.S. Pat. No. 6,881,308 B2

[4] Marnellos, G., Zisekas, S., and Stoukides, M. (2000). Synthesis of ammonia at atmospheric pressure with the use of solid state proton conductors. J. Catal. 193, 80-88. doi: 10.1006/jcat.2000.2877

[5] Lan, R., Irvine, J. T. S., and Tao, S. (2013). Synthesis of ammonia directly from air and water at ambient temperature and pressure. Sci. Rep. 3, 1145. doi:10.1038/srep01145

[6] Skodra, A., and Stoukides, M. (2009). Electrocatalytic synthesis of ammonia from steam and nitrogen at atmospheric pressure. Solid State Ionics 180, 1332-1336.

SUMMARY OF THE INVENTION

An object of the present invention is to provide alternative methods and apparatus for the synthesis of ammonia from water and nitrogen $N_2$.

The above object is achieved In accordance with the present invention by an electrochemical cell that has a first volume exposed to respective surfaces of an anode and a cathode, a steam inlet that allows steam into the first volume, and a layer of solid oxide conducting material positioned to impede steam from the steam inlet from reaching the anode.

BRIEF DESCRIPTION OF THE DRAWINGS

The FIGURE illustrates an exemplary electrochemical cell as provided by an embodiment of the present invention.

DESCRIPTION OF THE PREFERRED EMBODIMENTS

The embodiment of the invention shown in the FIGURE includes an electrochemical cell 10 with three porously partitioned volumes 1-3.

The first volume 1 contains a nitride conductor 20 such as a molten salt eutectic, for example LiCl/KCl/Li$_3$N. In use, steam $H_2O$ is introduced into this first volume through a steam inlet 5. A steam diffuser 22 may be provided to ensure wide distribution of inlet steam.

The second volume 2 is a cathode gas electrode. Nitrogen gas $N_2$ 26 is introduced into this gas electrode, on a surface of the porous electrode 24 away from the nitride conductor 20.

The third volume 3 is an anode gas electrode. A porous electrode 28 is in contact with the nitride conductor 20 on one side.

A DC power supply 7 applies a potential difference between the two porous electrodes 24, 28, with the more positive voltage +V being applied to the anode gas electrode 3 and the more negative voltage −V being applied to the cathode gas electrode 2. Typically, the applied potential difference may be in the region of 0.5 V to 2 V.

In use, nitrogen gas is reduced to nitride ions at the gas cathode 2:

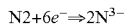
$$N_2 + 6e^- \Rightarrow 2N^{3-}$$

Within the nitride conductor 20, the nitride ions migrate towards the anode under the influence of the voltage gradient between the anode and the cathode. Within the nitride conductor 20, the nitride ions encounter and react with steam (water) to produce ammonia:

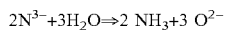
$$2N^{3-} + 3H_2O \Rightarrow 2\,NH_3 + 3\,O^{2-}$$

Ammonia is accordingly produced from nitrogen gas and steam. The ammonia diffuses through the nitride conductor 20 to be evolved at the surface of the nitride conductor. An enclosure 6 traps the evolved ammonia gas and allows it to be harvested. The resulting oxide ions migrate towards the anode under the potential gradient between the electrodes. The anode reaction returns electrons to the DC power supply and generates oxygen into the gas anode electrode:

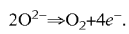
$$2O^{2-} \Rightarrow O_2 + 4e^-.$$

According to a feature of the present invention, a layer of solid oxide conducting material 4, such as yttria stabilized zirconia, is placed between the porous anode 28 and the nitride conductor 20. The layer of solid oxide conducting material may be bonded to the porous anode 28 or may simply be immersed in the nitride conductor. Oxide ions $O^{2-}$ diffuse through the electrically insulating porous material 4 to the anode 28 under the influence of the potential gradient between the anode 28 and the cathode 24. The $O^{2-}$ ions are able to diffuse through the layer of solid oxide conducting material, but water molecules cannot pass through this layer. Examples of suitable solid oxide conducting materials include yttria-stabilized zirconia (YSZ) (often the 8% form Y8SZ), scandia stabilized zirconia (ScSZ) (usually 9 mol % Sc$_2$O$_3$–9ScSZ) and gadolinium doped ceria (GDC). Other options include perovskite materials such as La1-xSrxGa1-yMgyO3-δ (LSGM).

In oxide ion conductors, current flow occurs by the movement of oxide ions through the crystal lattice. This movement is a result of thermally-activated movement of the oxide ions, moving from crystal lattice site to crystal lattice site, with a superimposed drift in the direction of the electric field. The ionic conductivity of an oxide ion conductor is consequently strongly temperature dependent. At high temperatures, this conductivity can approach values close to 1 S.cm$^{-1}$, which is comparable to the levels of ionic conductivity found in liquid electrolytes.

The layer of solid oxide conducting material 4 shields the porous anode from the water molecules (steam) within the nitride conductor. In the absence of such an electrically insulating porous material shield, the following unwanted reduction would take place at the anode and would contaminate the evolved ammonia NH3 with hydrogen H2 as well as providing a competing side reaction thereby reducing the efficiency:

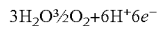

$$3H_2O \tfrac{3}{2}O_2 + 6H^+ 6e^-$$

Ammonia gas diffuses through nitride conductor 20 and is trapped in enclosure 6. It may be dried and cleaned as necessary, and may be stored for later use.

The structure of the electrochemical cell of the present invention allows steam $H_2O$ to be used as the source of hydrogen in the ammonia product, rather than hydrogen $H_2$ as was commonly the case in conventional methods and apparatus for synthesizing ammonia. This enables the electrochemical synthesis of ammonia $NH_3$ without requiring a separate electrolysis stage to generate hydrogen $H_2$, or the need to buy and store hydrogen $H_2$, resulting in a much simpler system design.

A particular feature of the present invention is the layer of solid oxide conducting material 4 which acts as an electrode protector, preventing steam from reaching the anode. The layer of solid oxide conducting material should allow the passage of oxide ions O2− under the influence of the applied potential gradient, but not the diffusion of water molecules H2O.

While the present invention has been described with particular reference to the application of ammonia synthesis from steam and nitrogen gas, the electrochemical cell and the synthesis method, of the present invention may be applied to the production of other gaseous products from first and second ionic components.

In general, means are provided for introducing a first source material 5 (in the above example, steam $H_2O$) into the first volume 1 and means are provided for introducing a second source material 26 (in the above example, nitrogen $N_2$) to a cathode 24. An electrolyte (in the above example in the form of the nitride conductor) is provided between anode 28 and cathode 24. Voltages +V and −V are applied respectively to the anode and cathode. At the cathode, a first ionic component (in the above example, $N^{3-}$) is produced from the second source material. The first ionic component traverses the electrolyte under the influence of the voltage gradient between the anode and the ground electrode, towards the anode. Within the electrolyte, the first ionic component encounters the first source material, and a reaction takes place to generate a product (in the above example, ammonia NH3) and an ionic by-product (in the above example, oxide ions O2−). The ionic by-product continues to traverse the electrolyte under the influence of the voltage gradient between the anode and the ground electrode, towards the anode. On reaching the anode, the ionic by-product gives up its charge and becomes an evolved by-product (in the above example, oxygen $O_2$).

Means should be provided to collect the product and preferably also the evolved by-product. Means may also be provided to collect any by-products generated at the anode or cathode.

Although the anode is described as a gas electrode arranged for collection of a gaseous by-product, such arrangement may not be necessary in electrochemical cells set up to perform a different reaction. In such cases, it may be sufficient to provide a solid cathode, in which case the third volume 3 may be omitted.

Although modifications and changes may be suggested by those skilled in the art, it is the intention of the Applicant to embody within the patent warranted hereon all changes and modifications as reasonably and properly come within the scope of the Applicant's contribution to the art.

The invention claimed is:

1. An electrochemical cell comprising:
   a first volume positioned between an anode and a cathode;
   a steam inlet that allows steam into the first volume; and
   a layer of solid oxide conducting material positioned to impede steam from the steam inlet from reaching the anode, wherein the first volume is positioned between the cathode and the layer of solid oxide conducting material; and
   a nitride conductor comprised within the first volume between the cathode and the layer of solid oxide conducting material, and configured to receive steam from the steam inlet.

2. An electrochemical cell according to claim 1 wherein the layer of solid oxide conducting material comprises yttria stabilized zirconia.

3. An electrochemical cell according to claim 1 wherein the layer of solid oxide conducting material comprises scandia stabilized zirconia (ScSZ), or gadolinium doped ceria.

4. An electrochemical cell according to claim 1 wherein the layer of solid oxide conducting material comprises a perovskite material.

5. An electrochemical cell according to claim 1 wherein the cathode is a gas electrode, comprising a porous cathode and a second volume.

6. An electrochemical cell according to claim 1 wherein the anode is a gas electrode, comprising a porous anode and a third volume.

7. An electrochemical cell according to claim 1 wherein the steam inlet is provided with a steam diffuser.

* * * * *